United States Patent
Fox et al.

(10) Patent No.: US 11,044,588 B2
(45) Date of Patent: Jun. 22, 2021

(54) SYSTEM AND METHOD FOR COLLABORATIVE CACHING

(71) Applicant: International Business Machines Corporation, Armonk, NY (US)

(72) Inventors: Jeremy R. Fox, Georgetown, TX (US); John Rice, Tramore (IE); Liam S. Harpur, Dublin (IE); Chris Kau, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/042,896

(22) Filed: Jul. 23, 2018

(65) Prior Publication Data

US 2020/0029189 A1 Jan. 23, 2020

(51) Int. Cl.
*H04W 4/44* (2018.01)
*H04W 8/00* (2009.01)
(Continued)

(52) U.S. Cl.
CPC .............. *H04W 4/44* (2018.02); *H04W 8/005* (2013.01); *H04W 4/021* (2013.01); *H04W 84/18* (2013.01)

(58) Field of Classification Search
CPC ....... H04W 4/44; H04W 8/005; H04W 4/021; H04W 84/18
See application file for complete search history.

(56) References Cited

U.S. PATENT DOCUMENTS 6,862,500 B2   3/2005   Tzamaloukas
7,457,676 B1 * 11/2008   Sutardja .................. G11B 27/11
                                              700/94

(Continued)

FOREIGN PATENT DOCUMENTS

WO     2014052841 A1     4/2014

OTHER PUBLICATIONS

Rugel, S. "Improving customer centricity by end-to-end Monitoring and big data analytics", 2014 Euro Med Telco Conference (EMTC), Nov. 12-15, 2014, pp. 1-5, IEEE, United States.
(Continued)

*Primary Examiner* — John A Follansbee
*Assistant Examiner* — Fadi Haj Said
(74) *Attorney, Agent, or Firm* — Sherman IP LLP; Kenneth L. Sherman; Hemavathy Perumal

(57) ABSTRACT

One embodiment provides a method comprising determining a recurring event involving a first vehicle based on location information for the first vehicle over a pre-determined period of time, and determining one or more recurring vehicles for the recurring event. Each recurring vehicle is a different vehicle, and a number of times the recurring vehicle is within proximity of the first vehicle over the pre-determined period of time satisfies a pre-determined threshold. The method further comprises establishing a vehicle social network including the first vehicle and the one or more recurring vehicles. The method further comprises generating a shared pool of resources and caching power by pooling together resources and caching power of each vehicle included in the vehicle social network, and utilizing the shared pool of resources and caching power to facilitate collaborative caching between vehicles in the vehicle social network.

20 Claims, 7 Drawing Sheets

(51) Int. Cl.
*H04W 4/021* (2018.01)
*H04W 84/18* (2009.01)

(56) References Cited

U.S. PATENT DOCUMENTS

| | | | | |
|---|---|---|---|---|
| 8,285,206 | B2* | 10/2012 | Martin | G06Q 10/109 |
| | | | | 455/41.2 |
| 8,346,589 | B1* | 1/2013 | Norton | G06Q 10/1093 |
| | | | | 705/7.18 |
| 8,374,777 | B2* | 2/2013 | Reich | G01C 21/26 |
| | | | | 340/995.12 |
| 8,478,514 | B2 | 7/2013 | Kargupta | |
| 8,620,510 | B1* | 12/2013 | Meuth | G06Q 10/063 |
| | | | | 701/26 |
| 8,937,660 | B2 | 1/2015 | Nerayoff et al. | |
| 8,953,044 | B2 | 2/2015 | Wu et al. | |
| 9,058,324 | B2 | 6/2015 | Kohlenberg et al. | |
| 9,060,381 | B2 | 6/2015 | Tarte et al. | |
| 9,077,631 | B2 | 7/2015 | Neisinger et al. | |
| 9,081,653 | B2 | 7/2015 | Ricci et al. | |
| 9,137,550 | B1 | 9/2015 | Velummylum et al. | |
| 9,349,234 | B2* | 5/2016 | Ricci | A61B 7/04 |
| 9,467,845 | B1* | 10/2016 | Rastogi | H04W 4/80 |
| 9,882,996 | B2* | 1/2018 | Faaborg | H04W 4/023 |
| 10,081,334 | B1* | 9/2018 | Chen | G06Q 30/0645 |
| 10,097,491 | B2* | 10/2018 | Lauer | H04B 7/18506 |
| 10,171,614 | B2* | 1/2019 | Duan | H04L 67/2842 |
| 10,353,931 | B2* | 7/2019 | Wheeler | G06F 9/54 |
| 10,356,742 | B2* | 7/2019 | Teller | H04W 40/20 |
| 2002/0087797 | A1* | 7/2002 | Adrangi | G06F 12/0888 |
| | | | | 711/133 |
| 2006/0059024 | A1 | 3/2006 | Bailey | |
| 2008/0270686 | A1 | 10/2008 | Grannan et al. | |
| 2009/0037034 | A1* | 2/2009 | Mattingly | G07C 5/008 |
| | | | | 701/3 |
| 2010/0217869 | A1* | 8/2010 | Esteban | H04L 67/2842 |
| | | | | 709/226 |
| 2011/0022678 | A1* | 1/2011 | Smith | G06F 21/552 |
| | | | | 709/215 |
| 2011/0051992 | A1* | 3/2011 | Cobb | G06K 9/00771 |
| | | | | 382/100 |
| 2011/0238258 | A1* | 9/2011 | Singh | G07C 5/0808 |
| | | | | 701/31.4 |
| 2012/0151073 | A1* | 6/2012 | Bai | G06F 16/9574 |
| | | | | 709/228 |
| 2013/0106595 | A1 | 5/2013 | Loce | |
| 2013/0217332 | A1 | 8/2013 | Altman | |
| 2013/0238441 | A1 | 9/2013 | Panelli | |
| 2013/0257631 | A1 | 10/2013 | Rangarajan et al. | |
| 2014/0078304 | A1 | 3/2014 | Othmer | |
| 2014/0160283 | A1 | 6/2014 | Hofman et al. | |
| 2014/0188990 | A1 | 7/2014 | Fulks | |
| 2014/0280735 | A1 | 9/2014 | Kalaboukis et al. | |
| 2015/0099469 | A1* | 4/2015 | Goldstein | H04W 4/80 |
| | | | | 455/41.2 |
| 2015/0103685 | A1 | 4/2015 | Butchko et al. | |
| 2015/0106312 | A1 | 4/2015 | Chen | |
| 2015/0211410 | A1 | 7/2015 | Saville et al. | |
| 2015/0227999 | A1 | 8/2015 | Maguire | |
| 2015/0256993 | A1 | 9/2015 | Bellamkonda | |
| 2015/0281303 | A1 | 10/2015 | Yousef | |
| 2015/0326447 | A1 | 11/2015 | Yoon | |
| 2015/0373565 | A1 | 12/2015 | Safavi | |
| 2016/0150451 | A1* | 5/2016 | Barreto De Miranda Sargento | H04W 36/14 |
| | | | | 370/332 |
| 2016/0173359 | A1* | 6/2016 | Brenner | H04L 67/12 |
| | | | | 600/301 |
| 2017/0061790 | A1 | 3/2017 | Jana et al. | |
| 2017/0093643 | A1 | 3/2017 | Ricci et al. | |
| 2019/0227553 | A1* | 7/2019 | Kentley-Klay | G05D 1/0088 |
| 2019/0313224 | A1* | 10/2019 | Yu | H04L 67/12 |

OTHER PUBLICATIONS

Anonymous, "Method and System for Generating a Distributed Video Buffering Plan", Sep. 18, 2014, pp. 1-4, IP.com United States.

Anonymous, "A Policy-controlled Adaptive Platform for Querying Real-time SmartPhone Data", Jun. 26, 2013, pp. 1-10, IP.com, United States.

Anonymous, "An intelligent recommendation system based on emotion analysis and behavior pattern recognition", Jul. 14, 2015, pp. 1-8, IP.com, United States.

"What's Dropbox?", Dropbox—Tour, Dropbox, Inc (US), 3 pages, downloaded from the Internet on Mar. 27, 2017, https://www.dropbox.com/tour/1.

"Get started with Google Drive", Google, Drive Help, pp. 1-2, Google, downloaded from: https://support.google.com/drive/answer/2424384?hl=en&ref_topic=14940.

"Anonymity Online", Tor Project: Anonymity Online, pp. 1-8, downloaded from: https://www.torproject.org/.

Garun, N., "Waze now displays AMBER alerts in-app, crowdsourcing drivers in the search for missing kids", The Next Web, Mar. 3, 2015, downloaded from: https://thenextweb.com/apps/2015/03/03/waze-now-displays-amber-alerts-in-app-crowdsourcing-drivers-in-the-search-for-missing-kids/.

Noble, K. et al., "GATSO USA Introduces Industry's First AMBER Alert Photo Enforcement Camera—Helping Police Stop Child Abductions", GATSO USA, Press Release, Nov. 24, 2008, downloaded from: http://www.gatso-usa.com/files/20081125_marketwire.pdf.

Kent, C., "Crowdsourcing for Cops", Jan. 13, 2015, pp. 1-5, Rewrite, downloaded from: http://rewrite.ca.com/us/articles/application-economy/crowdsourcing-for-cops.html.

List of IBM Patents or Patent Applications Treated as Related; Cunico, H.A. et al., U.S. Appl. No. 14/878,309, filed Oct. 8, 2015; Bostick, J.E., et al., U.S. Appl. No. 14/939,065, filed Nov. 12, 2015.

Mell, P., et al., "The NIST Definition of Cloud Computing", National Institute of Standards and Technology Special Publication 800-145, Sep. 2011, pp. 1-7, U.S. Department of Commerce, United States.

Zhang, Y. et al., "Roadcast: A Popularity Aware Content Sharing Scheme in VANETs," Mobile Computing and Communications Review, Oct. 2009, pp. 1-14, vol. 13 No. 4, IEEE, United States.

Das, S. et al., "SPAWN: a swarming protocol for vehicular ad-hoc wireless networks," VANET, Oct. 2004, pp. 1-2, ACM, United States.

Lakas, A. et al., "Geocache: Sharing and Exchanging Road Traffic Information Using Peer-to-peer Communication", Vehicular Vehicular Technology Conference, Jun. 2011, pp. 1-8, IEEE, United States.

Domingos Da Cunha, F. et al., "Socially Inspired Data Dissemination for Vehicular Ad Hoc Networks," MSWiM '14 Proceedings of the 17th ACM international conference on Modeling, analysis and simulation of wireless and mobile systems, Sep. 2014, pp. 1-6, ACM, Montreal, Canada.

* cited by examiner

US 11,044,588 B2

SYSTEM AND METHOD FOR COLLABORATIVE CACHING

The present invention generally relates to caching, and more particularly, to a system and method for collaborative caching between vehicles.

BACKGROUND

With the rise of the Internet of Things in recent years, many consumer devices that were previously unconnected are now internet ready devices that may wirelessly connect to the Internet to retrieve data or automate systems. Vehicles are now a major element of this emerging technology, with some consumer reports predicting that one in five vehicles will have some form of wireless connection by 2020. As the trend of vehicles becoming internet ready devices increases, there will be a need for vehicles to be able to wirelessly download different types of data such as, but not limited to, music, videos, operating system updates, traffic updates, etc. Vehicles may wirelessly connect to the Internet using 5G SIM cards, personal hot spot mobile devices, or WiFI access points located at different locations, such as car parks, petrol stations, etc.

SUMMARY

One embodiment provides a method comprising determining a recurring event involving a first vehicle based on location information for the first vehicle over a pre-determined period of time, and determining one or more recurring vehicles for the recurring event. Each recurring vehicle is a different vehicle, and a number of times the recurring vehicle is within proximity of the first vehicle over the pre-determined period of time satisfies a pre-determined threshold. The method further comprises establishing a vehicle social network including the first vehicle and the one or more recurring vehicles. The method further comprises generating a shared pool of resources and caching power by pooling together resources and caching power of each vehicle included in the vehicle social network, and utilizing the shared pool of resources and caching power to facilitate collaborative caching between vehicles in the vehicle social network.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
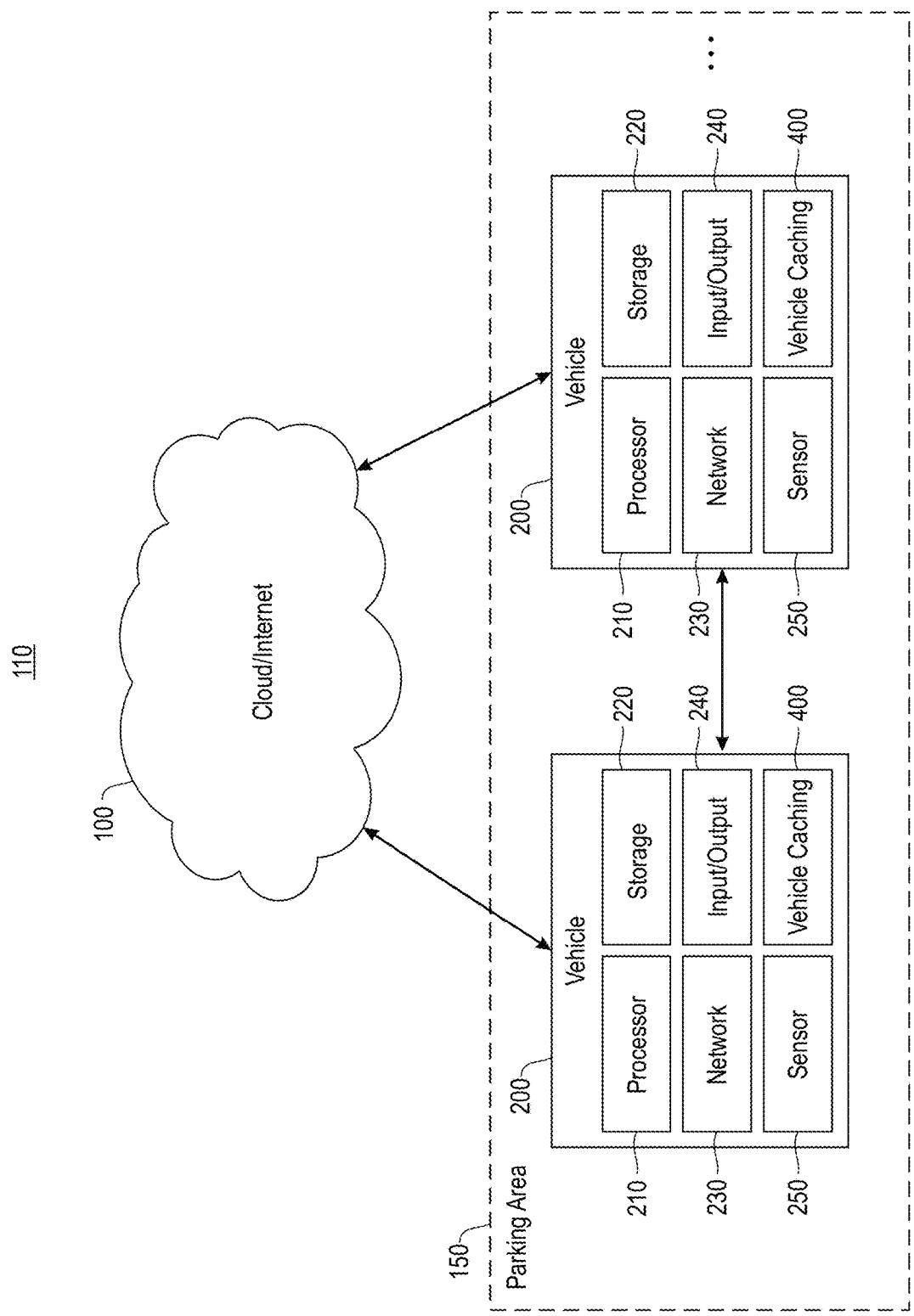
FIG. 1 illustrates an example framework for collaborative caching between vehicles, in accordance with an embodiment of the invention.

The detailed description explains the preferred embodiments of the invention, together with advantages and features, by way of example with reference to the drawings.

DETAILED DESCRIPTION

The present invention generally relates to caching, and more particularly, to a system and method for collaborative caching between vehicles. One embodiment provides a method comprising determining a recurring event involving a first vehicle based on location information for the first vehicle over a pre-determined period of time, and determining one or more recurring vehicles for the recurring event. Each recurring vehicle is a different vehicle, and a number of times the recurring vehicle is within proximity of the first vehicle over the pre-determined period of time satisfies a pre-determined threshold. The method further comprises establishing a vehicle social network including the first vehicle and the one or more recurring vehicles. The method further comprises generating a shared pool of resources and caching power by pooling together resources and caching power of each vehicle included in the vehicle social network, and utilizing the shared pool of resources and caching power to facilitate collaborative caching between vehicles in the vehicle social network.

For expository purposes, the term "vehicle user" as used herein generally refers to any type of vehicle, such as, but not limited to, a personal vehicle (e.g., a car, a motorcycle, a moped, etc.), a commercial vehicle (e.g., a delivery van, etc.), a passenger vehicle (e.g., a bus), etc.

For expository purposes, the term "vehicle user" as used herein generally refers to an individual associated with a vehicle, such as, but not limited to, a driver of the vehicle, an owner of the vehicle, a passenger of the vehicle, etc.

For expository purposes, the term "parking area" as used herein generally refers to a geographical location where one or more vehicles may be parked/stationed. Examples of parking areas include, but are not limited to, a car park, a garage, a parking lot or any other type of parking structure proximate to a place of residence (e.g., a house, an apartment building, etc.), a place of business (e.g., an office building, a shopping mall, etc.), a place of recreation (e.g., a city park, a sports stadium, a concert venue), etc.

One embodiment provides a system and a method for cache sharing in a vehicle social network. The vehicle social network comprises one or more learned social circles of vehicles. A vehicle included in a learned social circle is trained to trust other vehicles within the same learned social circle, such that the vehicle can cache and share data that is relevant to one or more vehicle users of one or more other vehicles (e.g., proximate drivers or passengers).

One embodiment provides a vehicle caching system for collaborative caching between vehicles. The system facilitates creation of vehicle social networks. For example, a vehicle such as a family car may travel to and from different locations, such as, but not limited to, home, work, stores and locations where recreational activities may take place such as a community center, a park, a concert venue, etc. The vehicle may be parked in parking areas proximate to the different locations, such as a car park at work, a car park at the community center, etc. A vehicle user of a vehicle parked at a car park is likely to have similar interests as another vehicle user of another vehicle parked at the same car park (i.e., like-minded vehicle users with similar needs, outlooks, perspectives, etc.). For example, vehicle users of vehicles parked at a car park of a golf club may have common interests in data related to golfing, such as golf training videos, agility techniques, etc.

FIG. 1 illustrates an example framework 110 for collaborative caching between vehicles 200, in accordance with an embodiment of the invention. The framework 110 comprises a plurality of vehicles 200. Each vehicle 200 is equipped with one or more computation resources such as, but not limited to, one or more processor units 210, one or more storage units 220, and one or more network units 230. One or more applications may execute/operate on a vehicle 200 utilizing one or more computation resources of the vehicle 200. In one embodiment, one or more applications that may execute/operate on a vehicle 200 include, but are not limited to, an on-board vehicle caching system 400 that facilitates collaborative caching between the vehicle 200 and one or more other vehicles 200 that are frequently proximate to the vehicle 200. As described in detail later herein, a vehicle caching system 400 of a vehicle 200 is configured to monitor presence of the vehicle 200 and one or more other vehicles 200 in one or more parking areas 150 over a period of time, determine which of the one or more other vehicles 200 to cluster together with the vehicle 200 to establish a vehicle social network, and enable caching and exchange of data among all vehicles 200 included in the same vehicle social network.

In one embodiment, one or more network units 230 of a vehicle 200 is configured to exchange data with one or more other vehicles 200 and/or the cloud/Internet 100 over a wireless connection (e.g., a WiFi connection, a cellular data connection, a Bluetooth connection, or any other type of wireless technology).

In one embodiment, a vehicle 200 comprises one or more input/output (I/O) modules 240 integrated in or coupled to the vehicle 200, such as a keyboard, a keypad, a touch interface, a display screen, etc. A vehicle user may utilize an I/O module 240 of a vehicle 200 to configure one or more user preferences, request for data, etc.

In one embodiment, a vehicle 200 comprises one or more sensor modules 250 integrated in or coupled to the vehicle 200, such as a GPS, a camera, a microphone, etc. A vehicle caching system 400 may utilize a sensor module 250 of a vehicle 200 to collect contextual information related to the vehicle 200. For example, a vehicle caching system 400 may utilize a GPS of a vehicle 200 to collect location information of the vehicle 200.

Each vehicle 200 has a unique identifier. A unique identifier of a vehicle 200 may be, but is not limited to, a vehicle identification number, an Internet Protocol (IP) address, or any other type of identification (e.g., an identification assigned by a vehicle caching system 400, such as "fdsdf67dfsfd5sg0sg6").

Figure 2:
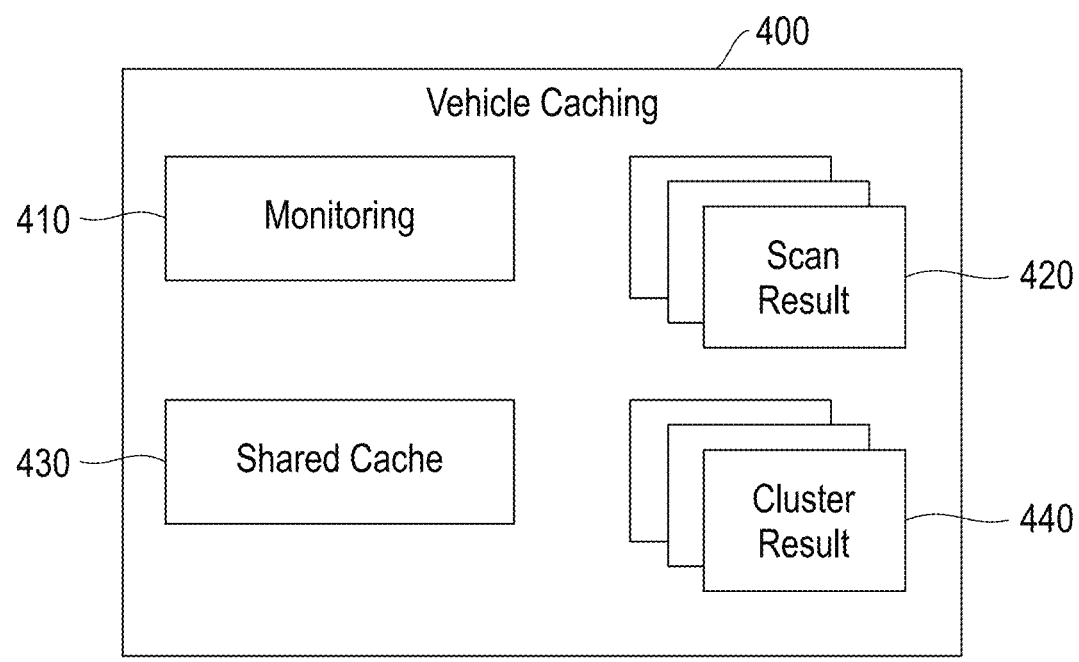
FIG. 2 illustrates an example implementation of an on-board vehicle caching system, in one or more embodiments.

FIG. 2 illustrates an example implementation of an on-board vehicle caching system 400, in one or more embodiments. In one embodiment, a vehicle caching system 400 of a vehicle 200 comprises a monitoring unit 410 configured to track one or more locations that the vehicle 200 travels to (e.g., favorite locations of a vehicle user, locations that the vehicle user frequently travels to, etc.). The monitoring unit 410 collects location information for the vehicle 200 over a pre-determined period of time utilizing one or more sensor modules 250 (e.g., GPS) of the vehicle 200. In one embodiment, the location information includes location graphs of the vehicle 200 for the pre-determined period of time (i.e., historical location information indicative of one or more prior locations of the vehicle 200 over the period of time). The pre-determined period of time may be a span of a few days, a few weeks, a few months, or any other duration of time. In one embodiment, the pre-determined period of time is 2 months.

In one embodiment, when the vehicle 200 comes to a stop and parks in a parking area 150 (e.g., a location away from a place of residence of a vehicle user), the monitoring unit 410 is configured to signify presence of the vehicle 200 in the parking area 150 by transmitting a unique identifier of the vehicle 200. The unique identifier transmitted may be received/detected by one or more other vehicles 200 within proximity of the vehicle 200 (e.g., one or more other vehicles 200 parked in the same parking area 150 as the vehicle 200).

In one embodiment, the monitoring unit 410 may utilize a network unit 230 of the vehicle 200 to wirelessly transmit the unique identifier. In another embodiment, the monitoring unit 410 may utilize another component of the vehicle 200 to transmit the unique identifier in Morse code (e.g., a Morse code of identification "fdsdf67df8sfd5sg0sg6"). For example, the monitoring unit 410 may utilize one or more lights (e.g., headlights) of the vehicle 200 to transmit the unique identifier as a series of lights. As another example, the monitoring unit 410 may utilize one or more alarms of the vehicle 200 to transmit the unique identifier as a series of clicks/beeps.

In one embodiment, the monitoring unit 410 is configured to transmit a unique identifier of the vehicle 200 in response to an occurrence of one of the following trigger conditions: parking of the vehicle 200, locking of the vehicle 200 (e.g., a vehicle user manually locking the vehicle 200 using a car key, automatically locking the vehicle 200 after a period of time has elapsed or when a vehicle user with a car key is no longer within proximity of the vehicle 200, etc.), unlocking of the vehicle 200 (e.g., a vehicle user manually unlocking the vehicle 200 using a car key, automatically unlocking the vehicle 200 when a vehicle user with a car key is within proximity of the vehicle 200, etc.), receiving from a vehicle user a request for data.

In one embodiment, the monitoring unit 410 is configured to monitor presence of one or more other vehicles 200 within proximity of the vehicle 200 by scanning for at least one unique identifier of at least one other vehicle 200 (e.g., another vehicle 200 parked in the same parking area 150 as the vehicle 200). In one embodiment, the monitoring unit 410 may utilize a network unit 230 of the vehicle 200 to scan for at least one unique identifier of at least one other vehicle 200 that is transmitted wirelessly. For example, the monitoring unit 410 may utilize a network unit 230 of the vehicle 200 to scan for at least one IP address (i.e., an IP scan) of at least one other vehicle 200 that is transmitted wirelessly. In another embodiment, the monitoring unit 410 may utilize a sensor module 250 of the vehicle 200 to scan for at least one unique identifier of at least one other vehicle 200 in Morse code. For example, the monitoring unit 410 may utilize one or more cameras or other light sensors of the vehicle 200 to scan for at least one unique identifier of at least one other vehicle 200 that is transmitted as a series of lights. As another example, the monitoring unit 410 may utilize one or more microphones or other sound sensors of the vehicle 200 to scan for at least one unique identifier of at least one other vehicle 200 that is transmitted as a series of clicks/beeps.

In one embodiment, the monitoring unit 410 is configured to generate a scan result 420 for a parking area 150 indicative of at least one unique identifier of at least one other vehicle 200 that the monitoring unit 410 scanned while the vehicle 200 is parked in the parking area 150. In one embodiment, a scan result 420 for a parking area 150 comprises, but is not limited to, the following: (1) spatiotemporal information indicative of a geographical location (i.e., location coordinates) of the parking area 150, and a particular start time, a particular end time and a particular day that the vehicle 200 is parked in the parking area 150, and (2) a list of at least one unique identifier (e.g., a list of IP addresses) of at least one other vehicle 200 that the monitoring unit 410 scanned while the vehicle 200 is parked in the parking area 150.

In one embodiment, the vehicle caching system 400 maintains a set of different scan results 420 for different parking areas 150 collected over the pre-determined period of time.

In one embodiment, the monitoring unit 410 is configured to scan for at least one unique identifier of at least one other vehicle 200 and generate a scan result 420 in response to an occurrence of one of the above-referenced trigger conditions.

In one embodiment, the vehicle caching system 400 comprises a shared cache unit 430 configured to determine one or more events that recur during the pre-determined period of time (i.e., recurring events) based on a set of scan results 420 collected over the pre-determined period of time. For example, assume a vehicle user of the vehicle 200 travels to and parks within proximity of a golf club every Thursday morning and Saturday morning. The shared cache unit 430 determines that parking within proximity of the golf club every Thursday morning and Saturday morning is a recurring event.

In one embodiment, the shared cache unit 430 is configured to determine, for each recurring event, one or more recurring vehicles for the recurring event, wherein each recurring vehicle is another vehicle 200 that is frequently within proximity of the vehicle 200 during the recurring event. In one embodiment, the shared cache unit 430 applies a clustering algorithm to the set of scan results 420 collected over the pre-determined period to generate a set of cluster results 440. Each cluster result 440 corresponds to a particular recurring event and comprises information indicative of all recurring vehicles determined for the recurring event. For example, if parking within proximity of a golf club every Thursday morning and Saturday morning is a recurring event, the shared cache unit 430 clusters the vehicle 200 together with one or more other vehicles 200 scanned by the monitoring unit 410 during the recurring event (i.e., one or more other vehicles 200 usually present in the same parking area 150 as the vehicle 200 every Thursday morning and Saturday morning).

In one embodiment, the shared cache unit 430 is configured to compare scan results 420 generated at different points of time for a recurring event, and update a cluster result 440 corresponding to the recurring event based on the comparison. For example, if the shared cache unit 430 determines that another vehicle 200 designated as a recurring vehicle for a recurring event is no longer present in the same parking area 150 as the vehicle 200 based on recent scan results 420 that are generated when the recurring event occurs, the shared cache unit 430 may remove a unique identifier of the another vehicle 200 from a corresponding cluster result 440 for the recurring event. As another example, if the shared cache unit 430 determines that another vehicle 200 not designated as a recurring vehicle for a recurring event is now present in the same parking area 150 as the vehicle 200 based on recent scan results 420 that are generated when the recurring event occurs, the shared cache unit 430 may add a unique identifier of the another vehicle 200 to a corresponding cluster result 440 for the recurring event.

In one embodiment, the shared cache unit 430 is configured to add/remove a unique identifier of another vehicle 200 to a cluster result 440 for a recurring event if a number of times the another vehicle 200 is present/not present during the recurring event satisfies a pre-determined threshold (e.g., another vehicle 200 is present in the same parking area 150 as the vehicle 200 nine times out of ten separate visits to the golf club that the vehicle user made during the pre-determined period of time).

Each recurring vehicle for a recurring event is a potential candidate that a vehicle user of the vehicle 200 may establish a social relationship with. In one embodiment, the shared cache unit 430 is configured to establish, for a recurring event, a corresponding vehicle social network that includes the vehicle 200 and at least one recurring vehicle for the recurring event. Establishing a vehicle social network allows for leveraging of resources (processing, storage, networking) of each vehicle included in the vehicle social network to form a shared pool of resources and caching power accessible by all vehicles 200 included in the vehicle social network. For example, the vehicles included in the vehicle social network may collaboratively cache data of interest to vehicles users of the vehicles 200 using the shared pool. For example, if a vehicle user of the vehicle 200 travels to work and to the gym every weekday, the shared cache unit 430 may establish a vehicle social network that is specific to the vehicle user's place of work and another vehicle social network that is specific to the gym.

In one embodiment, a vehicle user may configure one or more operational parameters of the vehicle caching system 400, such as the pre-determined period of time or the pre-determined threshold, via an I/O module 240 of the vehicle 200.

In one embodiment, the shared cache unit 430 is configured to facilitate caching and exchange of data among vehicles 200 included in a same vehicle social network. In one embodiment, the shared cache unit 430 is configured to receive resource information associated with a recurring vehicle from a vehicle caching system 400 of the recurring vehicle. Resource information associated with a recurring vehicle is indicative of one or more available resources of the recurring vehicles, such as, but not limited to, amount of caching power available, a type of network connectivity that recurring vehicle has to the cloud/Internet 100 (e.g., 5G SIM cards, personal hot spot mobile devices, WiFi access points, etc.), and a strength of the network connectivity. In one embodiment, the shared cache unit 430 is configured to receive resource information associated with a recurring vehicle on a periodic basis (e.g., each time the recurring vehicle is within proximity of the vehicle 200).

In one embodiment, the shared cache unit 120 is configured to determine, based on resource information associated with each vehicle 200 included in a vehicle social network, which vehicle 200 of the vehicle social network has the fastest connection speed to the cloud/Internet. A vehicle 200 with slow connection speed to the cloud/Internet 100 may utilize network connectivity of another vehicle 200 in the same vehicle social network but with faster or the fastest connection speed to retrieve data of interest from the cloud/Internet 100.

Figure 3:
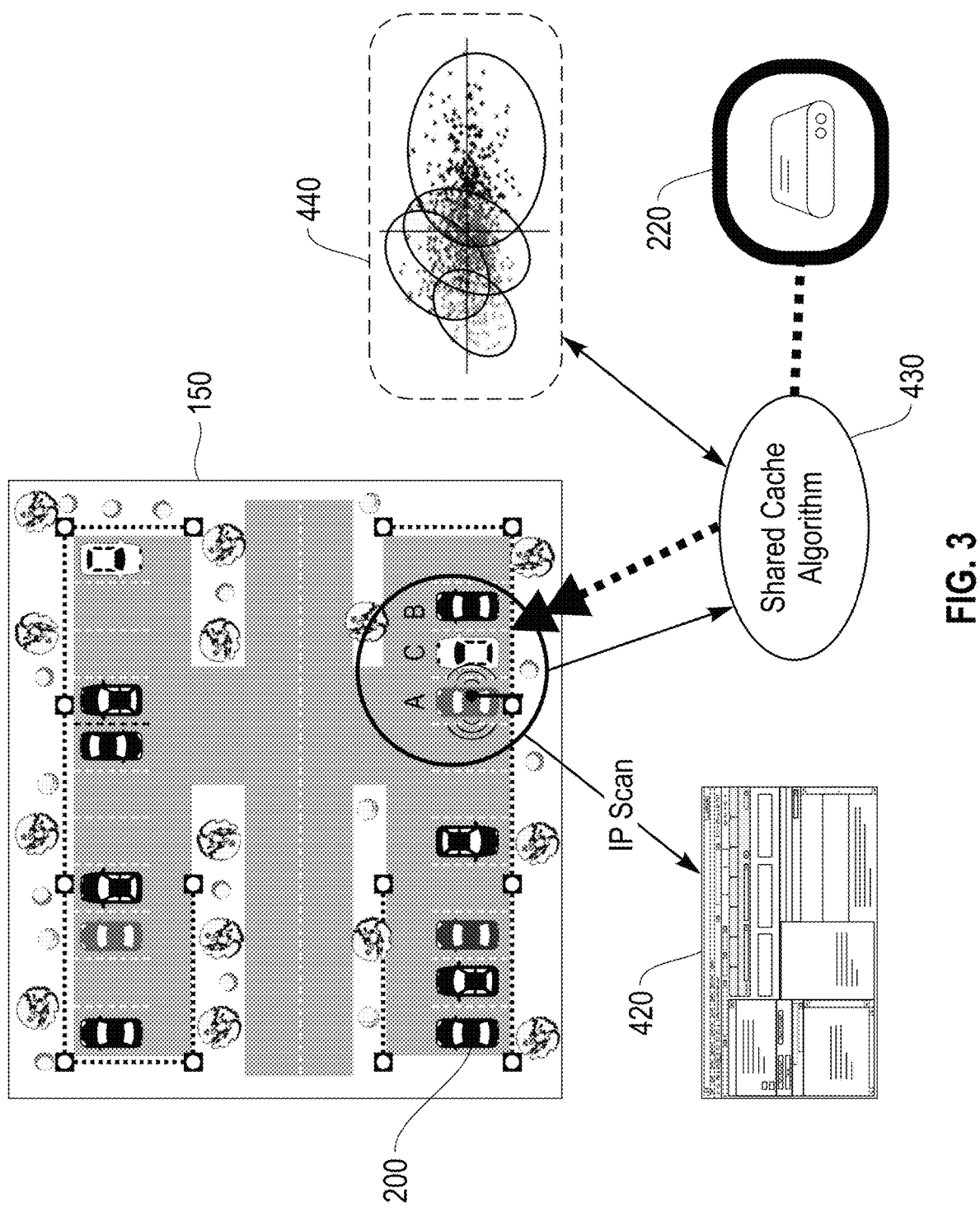
FIG. 3 illustrates an example vehicle social network, in one or more embodiments.

FIG. 3 illustrates an example vehicle social network, in one or more embodiments. For example, assume that, over time, a vehicle caching system 400 of a first vehicle 200 ("A") generates, for a recurring event (e.g., vehicle A parking within proximity of a city park every Saturday afternoon), a corresponding cluster result 440 indicating that one or more other vehicles 200, such as a second vehicle 200 ("B") and a third vehicle 200 ("C"), are recurring vehicles that should be clustered together with vehicle A for the recurring event. The vehicle caching system 400 of vehicle A establishes a vehicle social network specific for the recurring event, wherein the vehicle social network includes vehicles A, B and C. Based on resource information associated with each of vehicles A, B and C, the vehicle caching system 400 of vehicle A may determine that vehicle C has the fastest connection speed to the cloud/Internet 100, and may issue an action request to a vehicle caching system 400 of vehicle C to retrieve and cache data (e.g., data of interest to a vehicle user of vehicle A, such as traffic news, etc.) from the cloud/Internet 100. The vehicle caching system 400 of vehicle A may then collect the cached data directly from vehicle C the next time vehicle C is within proximity of vehicle A.

The next time the recurring event occurs again and a scan result 420 generated by the vehicle caching system 400 of vehicle A indicates that vehicles B and C are simultaneously present in the same parking area 150 as vehicle A, the vehicle caching system 400 of vehicle A may then collect the cached data directly from vehicle C at this time.

In one embodiment, a vehicle caching system 400 of a vehicle 200 may issue other types of requests to another vehicle 200 in its vehicle social network. For example, the vehicle caching system 400 of vehicle A may issue a friend request to the vehicle caching system 400 of vehicle B, requesting permission to transmit data (e.g., an encrypted file) from vehicle A to vehicle B and maintain/save the data on one or more storage units 220 of vehicle B so that the vehicle caching system 400 of vehicle A may pull the data from vehicle B when a vehicle user of vehicle A needs it later.

Figure 4:
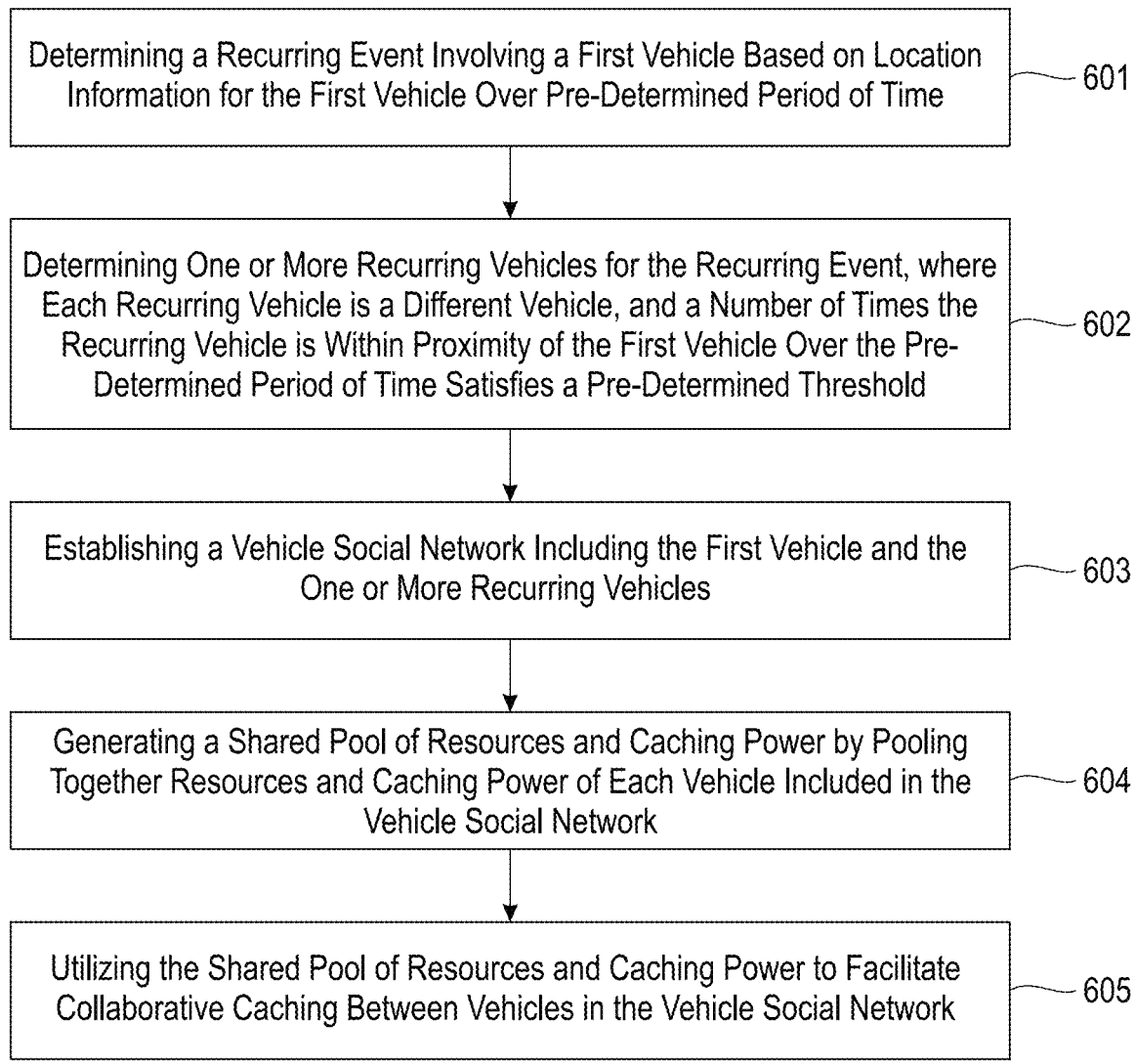
FIG. 4 is a flowchart of an example process for establishing a vehicle social network, in accordance with an embodiment of the invention.

FIG. 4 is a flowchart of an example process 600 for establishing a vehicle social network, in accordance with an embodiment of the invention. Process block 601 includes determining a recurring event involving a first vehicle based on location information for the first vehicle over a pre-determined period of time. Process block 602 includes determining one or more recurring vehicles for the recurring event, wherein each recurring vehicle is a different vehicle, and a number of times the recurring vehicle is within proximity of the first vehicle over the pre-determined period of time satisfies a pre-determined threshold. Process block 603 includes establishing a vehicle social network including the first vehicle and the one or more recurring vehicles. Process block 604 includes generating a shared pool of resources and caching power by pooling together resources and caching power of each vehicle included in the vehicle social network. Process block 605 includes utilizing the shared pool of resources and caching power to facilitate collaborative caching between vehicles in the vehicle social network.

In one embodiment, process blocks 601-605 may be performed by one or more components of a vehicle caching system 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 5:
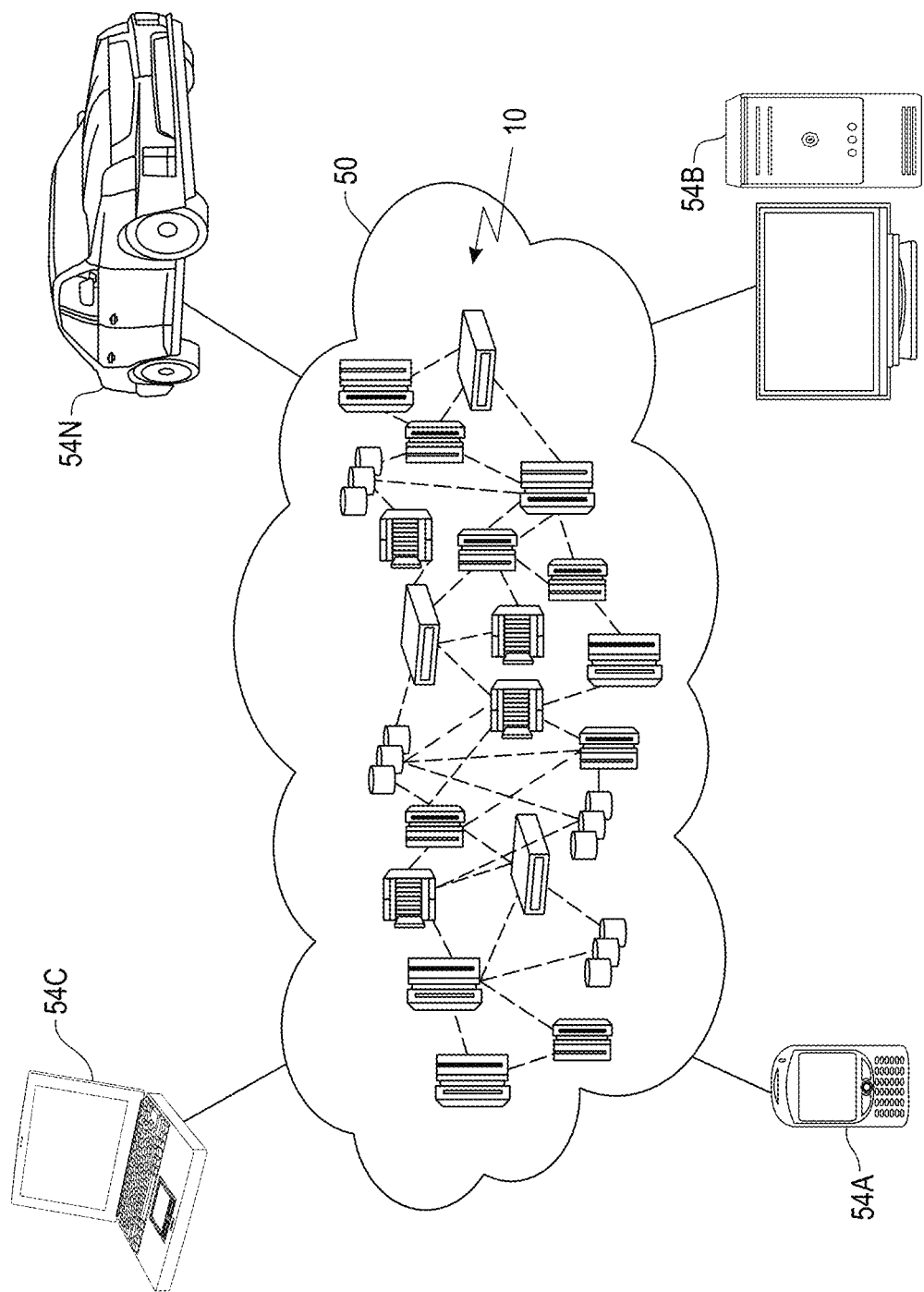
FIG. 5 depicts a cloud computing environment according to an embodiment of the present invention.

FIG. 5 depicts a cloud computing environment 50 according to an embodiment of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
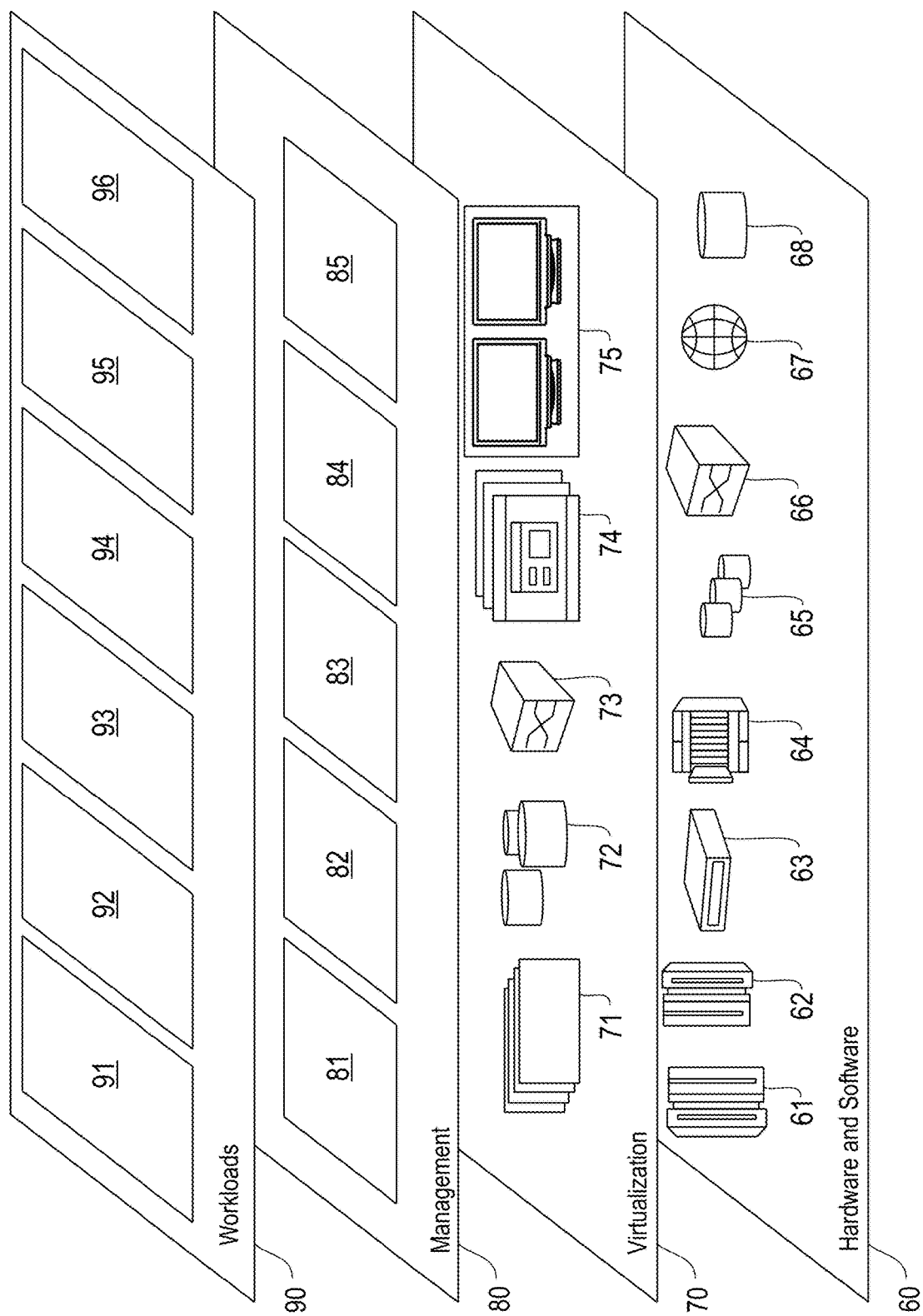
FIG. 6 depicts abstraction model layers according to an embodiment of the present invention.

FIG. 6 depicts a set of functional abstraction layers provided by cloud computing environment 50 according to an embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative caching between vehicles 96.

Figure 7:
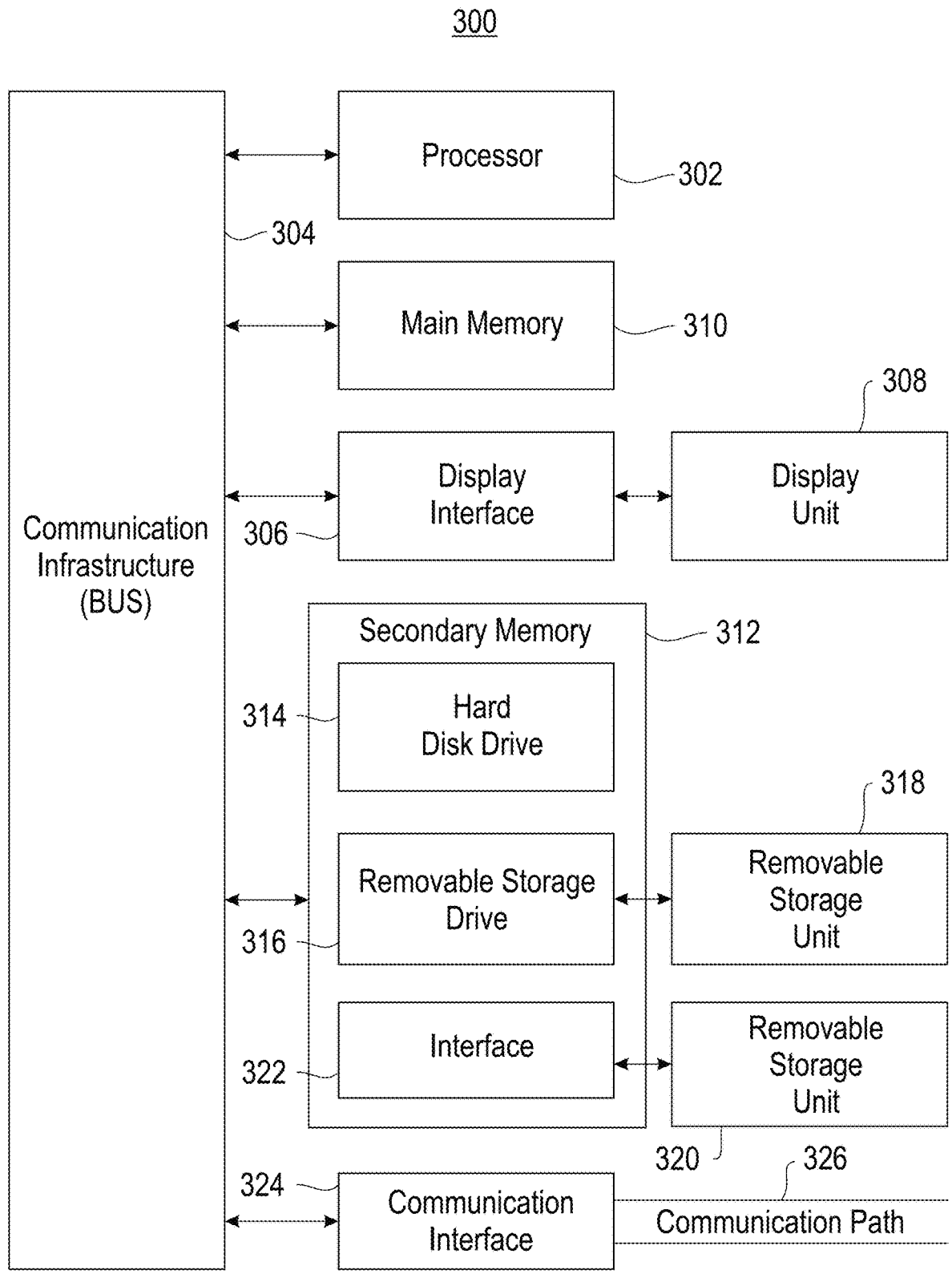
FIG. 7 is a high level block diagram showing an information processing system useful for implementing an embodiment of the present invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining one or more recurring events involving a first vehicle by:
   collecting a set of scan results generated at different points of time over a pre-determined period of time, wherein each scan result generated at each point of time is indicative of a geographical location of the first vehicle at the point of time and is further indicative of at least one unique identifier of at least one additional vehicle within proximity of the first vehicle at the point of time; and
   applying a clustering algorithm to the set of scan results to generate one or more cluster results, wherein each cluster result corresponds to a recurring event and comprises one or more unique identifiers of one or more additional vehicles involved in the recurring event, each additional vehicle is different from the first vehicle, and a number of times the additional vehicle is within proximity of the first vehicle over the pre-determined period of time satisfies a pre-determined threshold; and
   for each recurring event:
   establishing a corresponding vehicle social network including the first vehicle and the one or more additional vehicles involved in the recurring event based on a cluster result corresponding to the recurring event;
   generating a shared pool of resources and caching power by pooling together resources and caching power of each vehicle included in the corresponding vehicle social network; and
   utilizing the shared pool of resources and caching power to facilitate collaborative caching between vehicles in the corresponding vehicle social network.

2. The method of claim 1, wherein:
   each recurring event is an activity that recurs at a particular space and a particular time over the pre-determined period of time; and
   resources and caching power of a vehicle comprises at least one of: one or more processor units for processing, one or more storage units for storage, or one or more network units for connecting to the Internet.

3. The method of claim 1, further comprising:
   for each recurring event:
   identifying a vehicle in the corresponding vehicle social network that has a connection to the Internet that is faster than any other vehicle in the corresponding vehicle social network; and
   utilizing the connection to the Internet of the vehicle identified to retrieve data from the Internet, wherein the data is cached on the vehicle identified, and the cached data is accessible by any other vehicle in the corresponding vehicle social network when within proximity of the vehicle identified.

4. The method of claim 1, further comprising:
   for each recurring event:
   issuing a request from the first vehicle to a second vehicle in the corresponding vehicle social network for permission for the first vehicle to transmit data to the second vehicle, store the data transmitted on the second vehicle, and retrieve the stored data transmitted from the second vehicle at a later time.

5. The method of claim 1, further comprising:
   for each recurring event:
   issuing a request from the first vehicle to a second vehicle in the corresponding vehicle social network for the second vehicle to retrieve data from the Internet and cache the data retrieved, wherein the first vehicle retrieves the cached data from the second vehicle when the first vehicle and the second vehicle are within proximity of each other.

6. The method of claim 1, wherein each vehicle is configured to transmit a unique identifier of the vehicle to signify presence of the vehicle to one or more other vehicles within proximity of the vehicle.

7. The method of claim 6, wherein each vehicle is configured to wirelessly transmit a unique identifier of the vehicle using wireless technology.

8. The method of claim 6, wherein each vehicle is configured to transmit a unique identifier of the vehicle as a series of lights in Morse code using one or more car lights of the vehicle.

9. The method of claim 6, wherein each vehicle is configured to transmit a unique identifier of the vehicle as a series of beeps in Morse code using one or more alarms of the vehicle.

10. The method of claim 6, wherein determining the one or more recurring events involving the first vehicle based on the location information for the first vehicle further comprises:
scanning for at least one unique identifier of at least one other vehicle.

11. A system comprising:
at least one processor; and
a non-transitory processor-readable memory device storing instructions that when executed by the at least one processor causes the at least one processor to perform operations including:
determining one or more recurring events involving a first vehicle by:
collecting a set of scan results generated at different points of time over a pre-determined period of time, wherein each scan result generated at each point of time is indicative of a geographical location of the first vehicle at the point of time and is further indicative of at least one unique identifier of at least one additional vehicle within proximity of the first vehicle at the point of time; and
applying a clustering algorithm to the set of scan results to generate one or more cluster results, wherein each cluster result corresponds to a recurring event and comprises one or more unique identifiers of one or more additional vehicles involved in the recurring event, each additional vehicle is different from the first vehicle, and a number of times the additional vehicle is within proximity of the first vehicle over the pre-determined period of time satisfies a pre-determined threshold; and
for each recurring event:
establishing a corresponding vehicle social network including the first vehicle and one or more additional vehicles involved in the recurring event based on a cluster result corresponding to the recurring event;
generating a shared pool of resources and caching power by pooling together resources and caching power of each vehicle included in the corresponding vehicle social network; and
utilizing the shared pool of resources and caching power to facilitate collaborative caching between vehicles in the corresponding vehicle social network.

12. The system of claim 11, wherein:
each recurring event is an activity that recurs at a particular space and a particular time over the pre-determined period of time; and
resources and caching power of a vehicle comprises at least one of: one or more processor units for processing, one or more storage units for storage, or one or more network units for connecting to the Internet.

13. The system of claim 11, wherein the operations further comprise:
for each recurring event:
identifying a vehicle in the corresponding vehicle social network that has a connection to the Internet that is faster than any other vehicle in the corresponding vehicle social network; and
utilizing the connection to the Internet of the vehicle identified to retrieve data from the Internet, wherein the data is cached on the vehicle identified, and the cached data is accessible by any other vehicle in the corresponding vehicle social network when within proximity of the vehicle identified.

14. The system of claim 11, wherein the operations further comprise:
for each recurring event:
issuing a request from the first vehicle to a second vehicle in the corresponding vehicle social network for permission for the first vehicle to transmit data to the second vehicle, store the data transmitted on the second vehicle, and retrieve the stored data transmitted from the second vehicle at a later time.

15. The system of claim 11, wherein the operations further comprise:
for each recurring event:
issuing a request from the first vehicle to a second vehicle in the corresponding vehicle social network for the second vehicle to retrieve data from the Internet and cache the data retrieved, wherein the first vehicle retrieves the cached data from the second vehicle when the first vehicle and the second vehicle are within proximity of each other.

16. The system of claim 11, wherein each vehicle is configured to transmit a unique identifier of the vehicle to signify presence of the vehicle to one or more other vehicles within proximity of the vehicle.

17. The system of claim 16, wherein determining the one or more recurring events involving the first vehicle based on the location information for the first vehicle further comprises:
scanning for at least one unique identifier of at least one other vehicle.

18. A computer program product comprising a computer-readable hardware storage medium having program code embodied therewith, the program code being executable by a computer to implement a method comprising:
determining one or more recurring events involving a first vehicle by:
collecting a set of scan results generated at different points of time over a pre-determined period of time, wherein each scan result generated at each point of time is indicative of a geographical location of the first vehicle at the point of time and is further indicative of at least one unique identifier of at least one additional vehicle within proximity of the first vehicle at the point of time; and
applying a clustering algorithm to the set of scan results to generate one or more cluster results, wherein each cluster result corresponds to a recurring event and comprises one or more unique identifiers of one or more additional vehicles involved in the recurring event, each additional vehicle is different from the first vehicle, and a number of times the additional vehicle is within proximity of the first vehicle over the pre-determined period of time satisfies a pre-determined threshold; and for each recurring event:
- establishing a corresponding vehicle social network including the first vehicle and one or more additional vehicles involved in the recurring event based on a cluster result corresponding to the recurring event;
- generating a shared pool of resources and caching power by pooling together resources and caching power of each vehicle included in the corresponding vehicle social network; and
- utilizing the shared pool of resources and caching power to facilitate collaborative caching between vehicles in the corresponding vehicle social network.

19. The computer program product of claim 18, wherein:
- each recurring event is an activity that recurs at a particular space and a particular time over the pre-determined period of time; and
- resources and caching power of a vehicle comprises at least one of: one or more processor units for processing, one or more storage units for storage, or one or more network units for connecting to the Internet.

20. The computer program product of claim 18, wherein the method further comprises:

for each recurring event:
- identifying a vehicle in the corresponding vehicle social network that has a connection to the Internet that is faster than any other vehicle in the corresponding vehicle social network; and
- utilizing the connection to the Internet of the vehicle identified to retrieve data from the Internet, wherein the data is cached on the vehicle identified, and the cached data is accessible by any other vehicle in the corresponding vehicle social network when within proximity of the vehicle identified.

* * * * *